Figure 1:
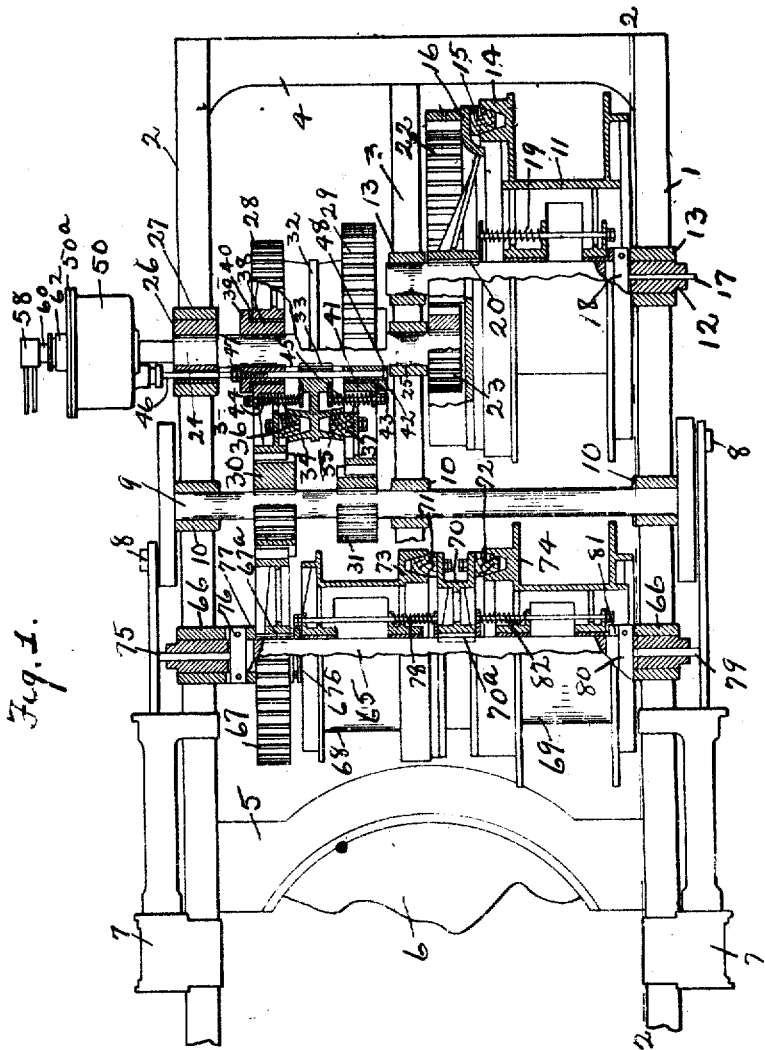

H. L. TURNEY.
LOGGING ENGINE.
APPLICATION FILED AUG. 20, 1919.

1,362,378.

Patented Dec. 14, 1920.
3 SHEETS—SHEET 1.

INVENTOR.
Harry L. Turney
BY
ATTORNEY.

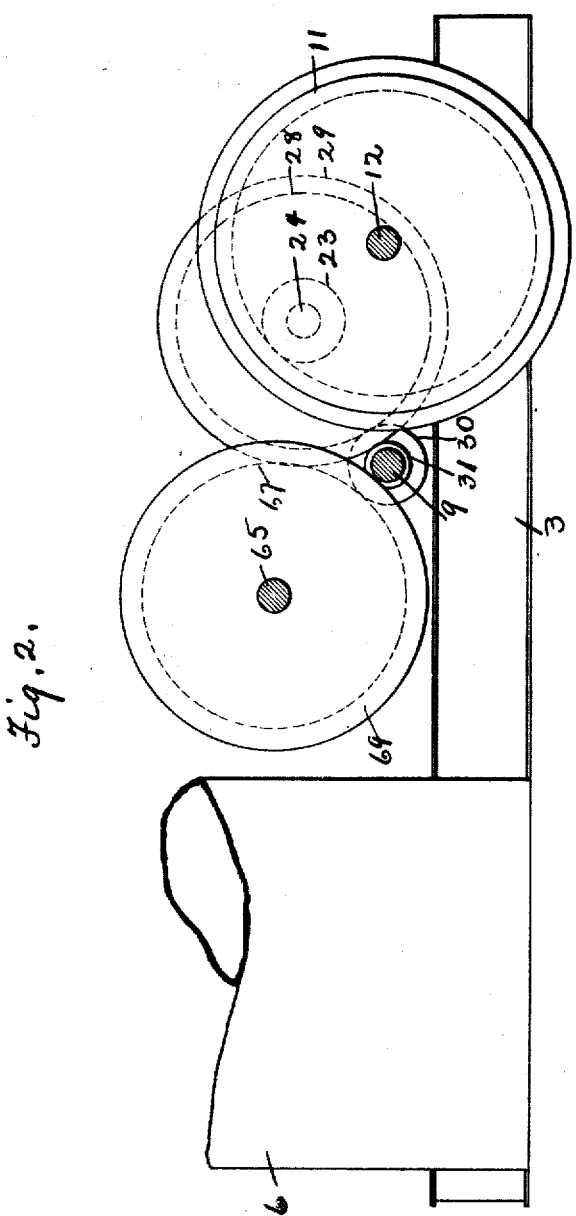

H. L. TURNEY.
LOGGING ENGINE.
APPLICATION FILED AUG. 20, 1919.
1,362,373.
Patented Dec. 14, 1920.
3 SHEETS—SHEET 3.
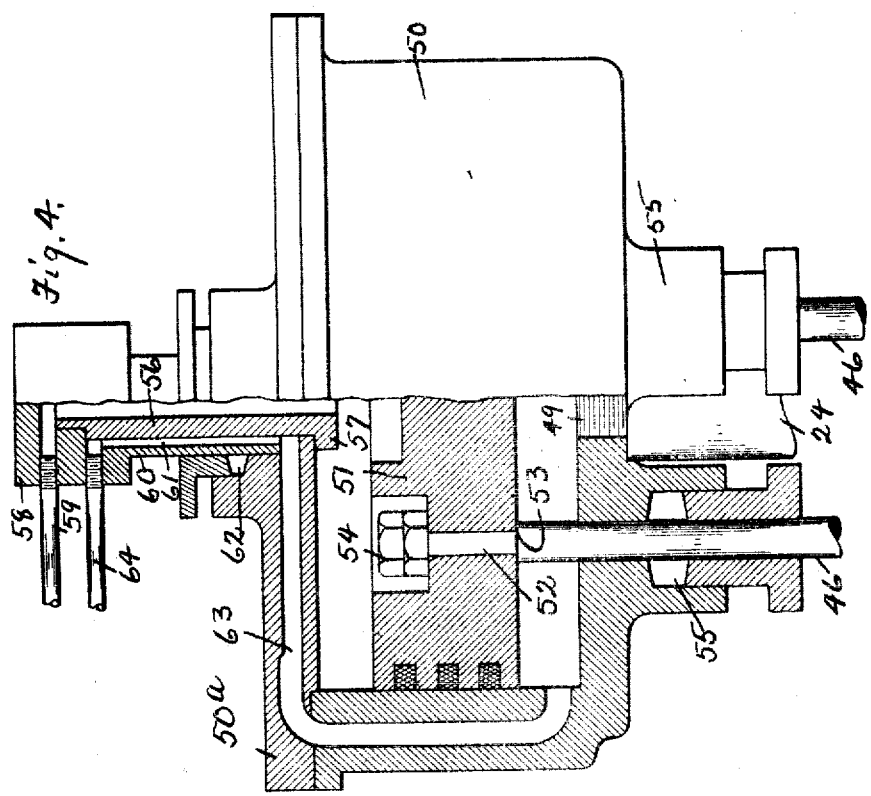
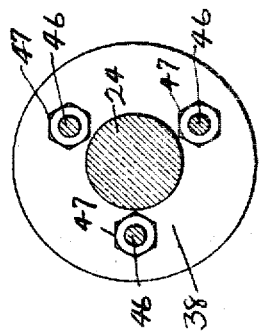
Inventor
Harry L. Turney
By
Attorney

UNITED STATES PATENT OFFICE.

HARRY L. TURNEY, OF PORTLAND, OREGON.

LOGGING-ENGINE.

1,362,373.  Specification of Letters Patent.  Patented Dec. 14, 1920.

Application filed August 20, 1919. Serial No. 318,668.

*To all whom it may concern:*

Be it known that I, HARRY L. TURNEY, a citizen of the United States, residing at Portland, in the county of Multnomah and State of Oregon, have invented new and useful Improvements in Logging-Engines, of which the following is a specification.

It is desirable in logging engines to have the main drum so arranged that it can be driven at two speeds from the same drive shaft. This is particularly true where there are other drums driven from this drive shaft because the secondary drums should be driven ordinarily at their maximum speeds at all times. It is also desirable that the mechanism may be such as to permit of the change of speed of the main drum while the drum is in motion. The construction to accomplish this purpose must be rugged because engines of this type are subjected to very severe use. With this invention the main drum is provided with varying speeds and the speed of the drum may be changed while in motion. The mechanism is rugged and of simple construction.

The invention is illustrated in the accompanying drawings as follows:—

Figure 1 shows a plan view, partly in section, of the engine.

Fig. 2 an outline view in section on the line 2—2 in Fig. 1.

Fig. 3 a section on the line 3—3, in Fig. 1.

Fig. 4 a plan view of the steam friction actuating mechanism, partly in section.

The frame is made up of the side beams 1 and 2, a centrally located longitudinal beam 3 and connecting beams 4 and 5.

The engine is provided with the usual boiler 6. Engines 7 are mounted on the side beams. The engines operate on the cranks 8 and operate the drive shaft 9. The drive shaft 9 is mounted in bearings 10 mounted on the beams 1, 2 and 3.

A main drum 11 is journaled on a shaft 12. The shaft 12 is journaled in bearings 13 in the beams 1 and 3. The drum is provided with a friction surface 14 operating against the friction blocks 15 on the gear wheel 16. A friction operating pin 17 extends into the end of the shaft 12 and may be operated by any friction actuating mechanism desired (not shown). The pin 17 operates on a cross plate 18. The plate 18 operates the drum and moves it axially on the shaft so as to move the friction surfaces into engagement. A spring 19 shifts the drum to move the friction surfaces out of engagement when the friction device operating on the pin 17 is released. The gear wheel 16 is locked on the shaft 12 by means of a key 20. The gear wheel is provided with an internal gear 22 and a pinion 23 meshes with the gear 22. The pinion 23 is mounted on an intermediate shaft 24. The intermediate shaft is journaled in a bearing 25 on the beam 3 and is supplied with a bushing 26 which is journaled in a bearing 27 on the beam 2. Gears 28 and 29 are journaled on the shaft 24 and these gears mesh with gears 30 and 31 fixed on the drive shaft 9. The gear ratio of the gears 28 and 30 differs from the gear ratio of the gears 29 and 31, the gear 30 being larger than the gear 32 and drives the gear 28 at a higher speed than the gear 29. For convenience, therefore, the gears 28 and 30 are designated as the high speed gears.

A driver 32 is locked on the shaft 24 by means of a key 33. It is provided with opposing friction surfaces 34 and 35. Friction blocks 36 on the gear 28 operate on the friction surface 34 and blocks 37 on the gear 29 operate on the friction surface 35. A bushing 38 is arranged on the shaft 24 and within the gear 28. This bushing is slidingly mounted on the shaft 24. It is provided with a shoulder 39 by means of which pressure may be exerted on the gear 28 and consequently on the friction blocks 36. A washer 40 may be arranged between the shoulder 39 and the gear 28 if desired. A similar bushing 41 is arranged on the shaft 24 within the gear 29 and is provided with a shoulder 42. The bushing 41 is slidingly mounted on the shaft 24 and the shoulder so engages the gear that when pressure is exerted on the bushing the gear may be moved axially on the shaft so as to move the blocks 37 into engagement with the friction surfaces 35. A washer 43 is provided between the shoulder and gear if desired. Springs 44 are arranged to operate on the gear 28 and move the friction blocks 34 out of engagement when released. A spring 45 moves the friction blocks 37 out of engagement when the gear 29 is released.

Operating rods 46, preferably three of them, extend through the bushings 26, 38 and 41. These rods are provided with adjusting nuts 47 which engage the bushing 38 and are provided with heads 48 engaging the bushing 41. It will be readily seen that when these rods are moved in one direction they will move the blocks 37 into engagement with the friction surfaces 35, thus throwing the low speed gear into engagement and when moved in the opposite direction they will release the low speed gear and operating through the bushing 38 force the blocks 36 into engagement with the friction surfaces 34, thus throwing the high speed into action. Both the high and low speed gears operate in the same direction and communicate their motion through the driver to the intermediate shaft and this through the pinion 23 and gear 22 communicates the movement to the main drum. The clearance of the friction blocks may be adjusted by the nuts 47 on the rods 46.

I prefer to operate the rods through a fluid-actuated friction device, the actuating fluid being ordinarily steam from the boiler. The end of the shaft 24 is screw-threaded at 49 and a cylinder 50 is secured on this screw-threaded end. The cylinder is provided with a cover 50ᵃ. A piston 51 operates in the cylinder. The rods 46 have the reduced ends 52 forming shoulders 53. The reduced ends extend through the piston and are secured by nuts 54. The rods extend through glands 55. It will be readily seen that as the piston is moved in either direction the rods are carried with them so as to throw in the high or low speed gear train as desired. A tube 56 extends from the outer end of the cylinder. This tube has a head 57 which secures it within the inner surface of the cover 50ᵃ. The outer end of the tube is secured in a head 58. A steam line 59 enters the head 58 and communicates with the tube 56 so as to deliver steam to the outer end of the cylinder. The steam line is controlled by a valve (not shown). Any type of valve may be used and ordinarily may be placed in such position as to be conveniently operated by the operator. The head 58 has an extension 60 forming an annular space 61 outside of the tube 56. This extension 60 extends through a gland 62 and the annular space 61 communicates with a port 63, the port leading to the opposite end of the cylinder from that to which the tube 56 leads. A supply pipe 64 leads into the head and delivers steam to the space 61. A suitable valve (not shown) is provided for the pipe 64 as well as the pipe 59 so that steam may be admitted and exhausted from the sides of the piston so as to move the piston in either direction.

A secondary shaft 65 is journaled in a bearing 66. A gear 67 is fixed on the shaft 65. Drums 68 and 69 are mounted on the shaft 65. A driver 70 is fixed on the shaft 65 by means of a key 70ᵃ. The driver has the friction blocks 71 and 72 adapted to engage the friction surfaces 73 and 74 on the drums 68 and 69 respectively. A thrust pin 75 extends through the end of the shaft 65 and is operated by any desirable friction device (not shown). It operates on a cross key 76, the cross key operating on a collar 77. The collar 77 communicates movement by the pins 67ᵃ to a collar 67ᵇ at the end of the drum 68. By moving the collar 77 endwise the drum 68 is moved axially so as to throw the friction surface 73 into engagement with the block 71. A spring 78 is provided for releasing the drum 68. A thrust pin 79 is arranged in the opposite end of the shaft 65 from the pin 75 and is operated by any convenient friction device. It operates a cross key 80. The cross key operates on a collar 81 to move the drum 69. The movement of the drum 69 throws the friction surface 74 into engagement with the block 72 when desired. A spring 82 releases the drum 69.

The drums 68 and 69 are designed to carry operating lines one of which is the trip line. The trip line handles the main line, that is to say, carries out the main line after it has been wound in on the main drum drawing in its load. Inasmuch as this carrying out of the main line involves practically the same load in each instance the trip line should be run at a comparatively high speed and at a uniform speed. With the main line it is desirable to vary its speed, a slower speed being used to give greater power when the load requires it and to give a better control when conditions make this slower speed desirable and to give the high speed where conditions will permit it and the power of the engine is sufficient to carry the load at such high speed. It will be readily seen as above described the main drum may be given two speeds and that the speed of the drum may be changed while the machine is in motion and that this variation of the speed of the main drum does not alter the speed of the drums 68 and 69.

What I claim as new is:—

1. In a logging engine, the combination of a driving shaft; a driven shaft; a drum driven by the driven shaft; a high speed gear connection between the drive shaft and the driven shaft; a low speed gear connection between the driving shaft and the driven shaft, both connections driving the driven shaft in the same direction; drivers between said gear connections and the driven shaft; clutches between the drivers and the gears; and a controlling mechanism for said clutches operated from one end of the driven shaft.

2. In a logging engine, the combination of a driving shaft; a driven shaft; a drum driven by the driven shaft; a high speed gear connection between the drive shaft and the driven shaft; a low speed gear connection between the driving shaft and the driven shaft, both connections driving the driven shaft in the same direction; drivers for said gear connections on the driven shaft; clutches between the drivers and the gears; a bearing for the driven shaft, both clutches being on one side of the bearing; and a clutch operating rod extending from said clutches and through said bearing.

3. In a logging engine, the combination of a driving shaft; a driven shaft; a drum driven by the driven shaft; a high speed gear connection between the drive shaft and the driven shaft; a low speed gear connection between the driving shaft and the driven shaft, both connections driving the driven shaft in the same direction; drivers for said gear connections on the driven shaft; clutches between the drivers and the gears; a bearing for the driven shaft; a clutch operating rod extending from said clutches and through said bearing, said rod operating one clutch by a movement in one direction and the other clutch by a movement in the opposite direction, and thrust devices operating on the rod, said devices being on the opposite side of the bearing from the clutch.

4. In a logging engine, the combination of a driving shaft; a driven shaft; a drum driven by the driven shaft; a high speed gear connection between the drive shaft and driven shaft; a low speed gear connection between the drive shaft and the driven shaft, both connections driving the driven shaft in the same direction; friction clutches connecting the driven shaft with said gear connections; a bearing for the driven shaft; and means extending through the bearing at one end of the driven shaft for operating said clutches.

5. In a logging engine, the combination of a driving shaft; a driven shaft; a drum driven by the driven shaft; a high speed gear connection between the drive shaft and driven shaft; a low speed gear connection between the drive shaft and the driven shaft, both connections driving the driven shaft in the same direction; a bearing for said driven shaft; a driver fixed on the driven shaft and having opposing friction surfaces; friction surfaces on the gear connections; and means for throwing the friction surfaces into and out of engagement to lock and release the high and low speed gear connections.

6. In a logging engine, the combination of a driving shaft; a driven shaft; a drum driven by the driven shaft; a high speed gear connection between the drive shaft and driven shaft; a low speed gear connection between the drive shaft and the driven shaft, both connections driving the driven shaft in the same direction; a bearing for said driven shaft; a driver fixed on the driven shaft and having opposing friction surfaces; friction surfaces on the gear connections; and means for throwing the friction surfaces into and out of engagement to lock and release the high and low speed gear connections comprising devices actuated from without the bearing.

7. In a logging engine, the combination of a driving shaft; a driven shaft; a drum driven by the driven shaft; a high speed gear connection between the drive shaft and driven shaft; a low speed gear connection between the drive shaft and the driven shaft, both connections driving the driven shaft in the same direction; a bearing for said driven shaft; a driver fixed on the driven shaft and having opposing friction surfaces; friction surfaces on the gear connections; means for throwing the friction surfaces into and out of engagement to lock and release the high and low speed gear connections comprising a rod extending through the bearing; and a friction device for moving the rod in the opposite directions.

8. In a logging engine, the combination of a driving shaft; a driven shaft; a drum driven by the driven shaft; a bearing for the driven shaft; a high speed gear connection between the drive shaft and driven shaft; a low speed gear connection between the drive shaft and driven shaft, both connections driving the driven shaft in the same direction and each having a gear journaled on the driven shaft at the same side of the bearing; a clutch for connecting the gears with the driven shaft; a bushing in said bearing; a rod extending from the clutch through said bearing; and means outside the bearing operating on the rod to set the clutch.

9. In a logging engine, the combination of a driving shaft; a driven shaft; a drum driven by the driven shaft; a bearing for the driven shaft; a high speed gear connection between the driving shaft and driven shaft; a low speed gear connection between the driving shaft and driven shaft, both connections driving the driven shaft in the same direction and each having a gear journaled on the driven shaft; a clutch for connecting the gears with the driven shaft; a bushing in said bearing; a plurality of rods extending from the clutch and through the bushing; and means outside the bearing for actuating said rods to actuate the clutch.

10. In a logging engine, the combination of a driving shaft; a driven shaft; a bearing for the driven shaft; clutch drivers fixed on the driven shaft; gears of different ratio mounted on the driven shaft; bushings slidingly mounted on the driven shaft on which said gears are mounted; friction surfaces on the gears adapted to engage the surfaces on the drivers; rods extending through said bushings adapted to throw said friction surfaces into engagement; and means for actuating said rods.

11. In a logging engine, the combination of a driving shaft; a driven shaft; a bearing for the driven shaft; clutch drivers fixed on the driven shaft; gears of different ratio mounted on the driven shaft; bushings slidingly mounted on the driven shaft on which said gears are mounted; friction surfaces on the gears adapted to engage the surfaces on the drivers; rods extending through said bushings adapted to throw said friction surfaces into engagement; a bushing in the bearing through which said rods extend; and means outside the bearing for actuating said rods.

12. In a logging engine, the combination of a driving shaft; a driven shaft; a drum driven by the driven shaft; friction drivers fixed on the driven shaft; gears mounted on the driven shaft; bushings in the gears; friction devices mounted on the gears and operating on the drivers; shoulders on the bushings adapted to operate as thrust bearings on the gears to move the friction devices into engagement; and rods operating on said bushings.

13. In a logging engine, the combination of a driving shaft; a driven shaft; a drum driven by the driven shaft; friction drivers fixed on the driven shaft; gears mounted on the driven shaft; bushings in the gears; friction devices mounted on the gears and operating on the drivers; shoulders on the bushings adapted to operate as thrust bearings on the gears to move the friction devices into engagement; rods operating on said bushings; a bearing for the driven shaft; a bushing in the bearing through which said rods extend; and means outside the bearing for operating said rods.

14. In a logging engine, the combination of a driving shaft; a driven shaft; a drum driven by the driven shaft; a low speed gear connection between the drive shaft and driven shaft; a high speed gear connection between the drive shaft and driven shaft; clutches for throwing said connections into engagement; a bearing for said driven shaft at one side of the clutches; a bushing in said bearing; rods extending through said bushing operating said clutches; and a fluid actuated friction device mounted on the shaft operating through said rods to actuate said clutches.

15. In a logging engine, the combination of a drum; a shaft driving said drum; a bearing for said shaft; a driving gearing mounted on said shaft and forming a driving connection for the drum; a clutch on said shaft for locking said gearing with the shaft; a bushing on said shaft arranged within said bearing; and an operating connection for said clutch extending through said bearing between the bearing and the shaft.

16. In a logging engine, the combination of a drum; a shaft driving said drum; a bearing for said shaft; a driving gearing mounted on said shaft and forming a driving connection for the drum; a clutch on said shaft for locking said gearing on the shaft; a bushing on said shaft arranged within said bearing; an operating connection for said clutch extending through said bearing between the bearing and the shaft, and a fluid actuated friction device mounted on the shaft and actuating said connection.

17. In a logging engine, the combination of a drum; a shaft for driving said drum; a gearing mounted on the shaft and forming a driving connection for the drum; two clutches on said shaft for locking said gearing with the shaft; a cylinder mounted on said shaft; a piston in the cylinder; ports leading to opposite sides of said cylinder adapted to move said piston in opposite directions; and a connection between the piston and the clutches.

18. In a logging engine, the combination of a drum; a shaft for driving said drum; a bearing for the shaft; a gearing mounted on the shaft and forming a driving connection for the drum; two clutches on said shaft for locking said gearing with the shaft; a cylinder mounted on said shaft; a piston in the cylinder; ports leading to opposite sides of said cylinder adapted to move said piston in opposite directions; a connection between the piston and the clutches; a bushing in the bearing; and rods extending from the piston through the bushing to the clutches.

19. In a logging engine, the combination of a drum; a shaft driving the drum; a gear mounted on the shaft and forming a driving connection for the drum; clutches on the shaft for locking said gearing with the shaft; a friction device on the shaft for operating said clutches comprising a cylinder; a piston in the cylinder; a tube extending from one end of the cylinder; a second tube surrounding the first tube and connected to the opposite end of the cylinder; and steam connections leading to said tubes.

20. In a logging engine, the combination of a drive shaft; a main drum; an internal gear driving said main drum; an intermediate shaft; a pinion on the intermediate shaft meshing with the internal gear; a low speed gear connection between the driving shaft and the intermediate shaft; a high speed gear connection between the driving shaft and the intermediate shaft; clutches for said gear connections; a secondary drum shaft; a secondary drum on said secondary shaft; and a gear connection between the driving shaft and said secondary drum.

21. In a logging engine, the combination of a drum; a shaft for driving said drum; a bearing for the shaft; a gearing mounted on the shaft and forming a part of the driving connection for the drum; two clutches on the shaft adapted to lock said gearing with the shaft; a cylinder mounted on the shaft; a piston in the cylinder; ports leading to opposite sides of said cylinder adapted to move said piston in opposite directions; and a connection between the piston and the clutches extending through the bearing.

22. In a logging engine, the combination of a drum; a high gear connection; a low gear connection leading to the drum; a shaft on which one gear of each connection is mounted; a clutch mechanism for locking said gears alternately with the shaft; a mounting for the shaft; and means having its thrust sustained by the shaft operating through the mounting for actuating said mechanism.

23. In a logging engine, the combination of a drum; a high gear connection; a low gear connection leading to the drum; a shaft on which one gear of each connection is mounted; a clutch mechanism for locking said gears alternately with the shaft; a mounting for the shaft; and means operating through the mounting for actuating said mechanism, said means operating from one end of the shaft.

24. In a logging engine, the combination of a drum; a high gear connection; a low gear connection leading to the drum; a shaft on which one gear of each connection is journaled each of said gears having a friction surface; two friction clutch elements locked against rotation on the shaft; a mounting for the shaft; and means having its thrust sustained by the shaft and operating through the mounting for setting and releasing said clutches.

25. In a driving mechanism the combination of a high gear connection; a low gear connection; a shaft on which one gear of each connection is mounted; a clutch mechanism for locking said gears alternately with the shaft; a mounting for the shaft; and means having its thrust sustained by the shaft and operating through the mounting for actuating said mechanism.

26. In a driving mechanism the combination of a high gear connection; a low gear connection; a shaft on which one gear of each connection is journaled each of said gears having a friction surface; two friction clutch elements locked against rotation on the shaft; a mounting for the shaft; and means having its thrust sustained by the shaft and operating through the mounting for setting and releasing said clutches.

27. In a driving mechanism, the combination of a shaft; two friction elements locked against rotation on the shaft; two gears mounted on the shaft and having friction surfaces adapted to engage the friction elements; and a fluid controlling device mounted on the shaft and having its movable element operating axially of the shaft in both directions to set said elements and surfaces alternately in engagement said controlling device having its thrust sustained by the shaft.

28. In a driving mechanism, the combination of a shaft; two friction elements fixed on the shaft; two gears journaled and slidingly mounted on the shaft, said gears having friction surfaces adapted to engage the friction elements; and a fluid actuated controlling device mounted on the shaft and having its movable element operating on the shaft in both directions to move said gears alternately into and out of engagement with the friction elements, said controlling device having its thrust sustained by the shaft.

In testimony whereof I have hereunto set my hand.

HARRY L. TURNEY.